(12) United States Patent
Shahbazi et al.

(10) Patent No.: US 10,509,900 B1
(45) Date of Patent: Dec. 17, 2019

(54) COMPUTER PROGRAM PRODUCTS FOR USER ACCOUNT MANAGEMENT

(71) Applicants: Majid Shahbazi, Oakton, VA (US); Mahmood Shahbazi, Oakton, VA (US)

(72) Inventors: Majid Shahbazi, Oakton, VA (US); Mahmood Shahbazi, Oakton, VA (US)

(*) Notice: Subject to any disclaimer, the term of this patent is extended or adjusted under 35 U.S.C. 154(b) by 33 days.

(21) Appl. No.: 15/229,636

(22) Filed: Aug. 5, 2016

Related U.S. Application Data (60) Provisional application No. 62/201,642, filed on Aug. 6, 2015.

(51) Int. Cl.
| | |
|---|---|
| *H04L 29/06* | (2006.01) |
| *G06F 21/45* | (2013.01) |
| *G06F 21/31* | (2013.01) |
| *G06F 21/32* | (2013.01) |

(52) U.S. Cl.
CPC .............. *G06F 21/45* (2013.01); *G06F 21/31* (2013.01); *G06F 21/32* (2013.01); *G06F 2221/2103* (2013.01); *H04L 63/0428* (2013.01)

(58) Field of Classification Search
CPC .............. G06F 21/45; G06F 2221/2103; H04L 63/0428
See application file for complete search history.

(56) References Cited

U.S. PATENT DOCUMENTS

| | | | |
|---|---|---|---|
| 5,875,296 A | 2/1999 | Shi et al. ........................ 726/5 |
| 6,243,816 B1 | 6/2001 | Fang et al. | |
| 6,263,446 B1 | 7/2001 | Kausik et al. .................. 726/5 |
| 7,360,096 B2 | 4/2008 | Bracewell et al. ........... 713/183 |
| 7,496,954 B1 | 2/2009 | Himawan et al. | |
| 7,690,026 B2 | 3/2010 | Zhu et al. | |
| 7,757,080 B1 | 7/2010 | Schilder .................. 713/162 |
| 8,024,781 B2 | 9/2011 | Saunders et al. ............... 726/5 |
| 8,327,141 B2 | 12/2012 | Vysogorets et al. | |
| 8,490,200 B2 | 7/2013 | Rivera et al. | |
| 8,551,186 B1 | 10/2013 | Strand | |
| 8,555,079 B2 | 10/2013 | Shablygin et al. | |
| 8,572,375 B2 | 10/2013 | Bishop et al. | |
| 8,656,180 B2 | 2/2014 | Shablygin et al. | |
| 8,661,254 B1 | 2/2014 | Sama | |
| 8,701,013 B2 | 4/2014 | Cox et al. | |
| 8,713,661 B2 | 4/2014 | Vysogorets et al. | |
| 8,751,794 B2 | 6/2014 | Hauluund | |
| 8,751,829 B2 | 6/2014 | Vysogorets et al. | |

(Continued)

FOREIGN PATENT DOCUMENTS

| | | |
|---|---|---|
| CN | 104778768 | 7/2015 |
| JP | 5802137 | 10/2015 |
| WO | WO 03/009621 | 1/2003 |

OTHER PUBLICATIONS

Shahbazi et al., U.S. Appl. No. 15/229,636, filed Aug. 5, 2016.
Shahbazi et al. U.S. Appl. No. 15/099,490, filed Apr. 14, 2016.

*Primary Examiner* — Alexander Lagor
*Assistant Examiner* — Wu V Tran (57) ABSTRACT

A user account/password manager is presented to protect any of: user accounts, passwords, and devices using security best practices. User account activity information is managed by a user and displayed in a meaningful way on an Account Management Graphical user interface. The user can easily find out who may be attempting to login to their account, when and how the login attempts were made, and where the login attempts originated.

17 Claims, 9 Drawing Sheets

(56) References Cited

U.S. PATENT DOCUMENTS

| | | |
|---|---|---|
| 8,752,153 B2 | 6/2014 | Vysogorets et al. |
| 8,769,618 B2 | 7/2014 | Husemann et al. |
| 8,800,061 B2 | 8/2014 | Glave |
| 8,819,444 B2 | 8/2014 | Shahbazi et al. |
| 8,819,769 B1 | 8/2014 | van Dijk et al. |
| 8,826,019 B2 | 9/2014 | Shablygin et al. |
| 8,826,399 B2 | 9/2014 | Dorso et al. |
| 8,839,391 B2 | 9/2014 | Vysogorets et al. |
| 8,855,300 B2 | 10/2014 | Weis et al. |
| 8,861,724 B2 | 10/2014 | Weis et al. |
| 8,869,245 B2 | 10/2014 | Ranganathan et al. |
| 8,924,712 B2 | 12/2014 | Varadarajan et al. |
| 8,932,368 B2 | 1/2015 | Fitzgerald et al. |
| 8,935,777 B2 | 1/2015 | DeSoto et al. |
| 8,943,320 B2 | 1/2015 | Sabin et al. |
| 8,972,719 B2 | 3/2015 | Shablygin et al. |
| 9,177,169 B2 | 11/2015 | Shablygin et al. |
| 9,203,824 B1 | 12/2015 | Nunn et al. |
| 9,356,924 B1 | 5/2016 | Shahbazi et al. |
| 2003/0012382 A1 | 1/2003 | Ferchichi et al. |
| 2003/0164400 A1 | 9/2003 | Boyd ............................ 235/382 |
| 2003/0182551 A1 | 9/2003 | Frantz et al. |
| 2003/0195858 A1 | 10/2003 | Watanabe et al. ............ 705/75 |
| 2004/0098609 A1 | 5/2004 | Bracewell et al. ........... 713/200 |
| 2004/0148253 A1 | 7/2004 | Shin et al. |
| 2005/0188222 A1* | 8/2005 | Motsinger ............. G06F 21/316 726/5 |
| 2007/0033393 A1 | 2/2007 | Ganesan et al. ............. 713/155 |
| 2008/0070593 A1* | 3/2008 | Altman ................. H04W 4/029 455/457 |
| 2008/0134308 A1 | 6/2008 | Yalakanti et al. |
| 2008/0141351 A1 | 6/2008 | Park |
| 2008/0276308 A1 | 11/2008 | Graser et al. |
| 2009/0055642 A1 | 2/2009 | Myers et al. ................. 713/155 |
| 2009/0172795 A1 | 7/2009 | Ritari et al. |
| 2009/0249439 A1 | 10/2009 | Olden et al. |
| 2009/0328171 A1 | 12/2009 | Bayus et al. |
| 2010/0070759 A1 | 3/2010 | Leon Cobos et al. |
| 2010/0134299 A1 | 6/2010 | Fitzgerald et al. |
| 2010/0242101 A1 | 9/2010 | Reese, Jr. ......................... 726/6 |
| 2010/0250735 A1* | 9/2010 | Andersen ............... G06Q 10/10 709/224 |
| 2010/0306547 A1 | 12/2010 | Fallows et al. ............... 713/178 |
| 2011/0205231 A1* | 8/2011 | Hartley ................... G06Q 40/00 345/440 |
| 2011/0219427 A1 | 9/2011 | Hito et al. |
| 2011/0277027 A1 | 11/2011 | Hayton et al. |
| 2013/0037429 A1 | 2/2013 | Sarnoff et al. ................. 206/232 |
| 2013/0183955 A1 | 7/2013 | Ron et al. |
| 2014/0182002 A1 | 6/2014 | Cox et al. |
| 2014/0189831 A1 | 7/2014 | Kemshall |
| 2014/0253466 A1* | 9/2014 | Brewer ............... G06F 3/03545 345/173 |
| 2014/0282923 A1 | 9/2014 | Narayan et al. |
| 2014/0282961 A1* | 9/2014 | Dorfman ............. H04L 63/0823 726/7 |
| 2014/0298491 A1 | 10/2014 | D'sa |
| 2014/0338006 A1 | 11/2014 | Grkov et al. |
| 2015/0109428 A1* | 4/2015 | Mechaley, Jr. ..... G06K 9/00288 348/77 |
| 2015/0261972 A1* | 9/2015 | Lee ..................... G06F 21/6218 713/165 |
| 2016/0034678 A1* | 2/2016 | Chandra ................. G06F 21/31 726/7 |
| 2016/0164850 A1* | 6/2016 | Chauhan ............. H04L 61/2007 726/7 |
| 2016/0285998 A1* | 9/2016 | Hardy ................. H04L 41/0806 |

* cited by examiner

COMPUTER PROGRAM PRODUCTS FOR USER ACCOUNT MANAGEMENT

This application claims priority to provisional application 62/201,642 filed Aug. 6, 2015.

FIELD OF THE INVENTION

The present disclosure relates generally to secure digital communication, and more particularly to management of user accounts.

SUMMARY OF THE INVENTION

The present disclosure aims to allow authorized users to manage login attempts to their accounts and/or devices in accordance with security best practices. It is noted that such login account activity may be monitored across multiple devices and platforms. As a result, the user's accounts and credentials are protected regardless of the device(s) used for access. Account activity information is collected from various sources, processed and presented to the user in an easy to understand format. This allows the user to quickly find out "who" is attempting to log in to their account, as well as "where" and "how" the attempt occurred. The present disclosure may be used in conjunction with a Password Manager to protect user accounts, passwords, devices, etc.

Generally speaking, user accounts may include any of: device accounts, web accounts, portal accounts, bank accounts, employee accounts, physical access accounts, single sign-on accounts, etc. Preferably, user accounts are managed using a Graphical User Interface (GUI) associated with a Single Sign On (SSO) account.

According to the disclosure, each time a login attempt is made to a user's account, "peripheral" information surrounding the login attempt is gathered and processed. In this way, the user is provided with a wealth of information collected any time an attempt is made to access their account. Peripheral information may include, for example: a photo/video of the user, a photo/video of the user's surroundings, the user's GPS location, a date/time stamp, the IP/network address where the attempt was made, surrounding temperature, and more.

Advantageously, users are conveniently provided with a graphical user interface, or "dashboard," for viewing account activity, controlling alert settings, and/or interfacing with other online security features.

According to a first aspect, a first computer program product is disclosed, that when executed, causes a computer to: establish a secure communication session with a login server over a communication network; instruct the computer to obtain peripheral information regarding a login attempt; and send the peripheral information to the login server to process and display the peripheral data to the authorized user such that the authorized user is able to identify who made the login attempt—as well as when and where the login attempt occurred.

In embodiments, the first computer program product further causes the computer to monitor login attempts to a user device/user account and determine whether the user requesting access to the user account via the computer is an authorized user. In one non-limiting example, such a determination is based on receipt of valid user credentials. Additionally or alternatively, the determination is based on: a certain number of failed login attempts; whether the user responds appropriately to a challenge (such as a displayed optical code); and/or whether the user is logging in from a suspicious physical location or IP address.

Thus in some respects, the present disclosure serves as a "burglar alarm" for user accounts, credentials and/or devices. In other words, when an intruder attempts to break in to a user's account, their photo and location may be immediately obtained and reported so that that they are caught "red-handed."

The present disclosure appreciates that hackers typically use multiple tools to attack. In response, a "multi-layered" approach to account management is provided so that additional layers remain even if one is penetrated. Consequently, hackers who employ a range of technologies to initiate their attacks are effectively warded off.

The present disclosure also understands that hackers do not typically stop with one user account (which, in some cases, may result in an outbreak). In response, means are provided to prevent such outbreaks before they happen. Important information regarding unauthorized log-in attempts is obtained that can be quickly and effectively sent to relevant authorities to stop intruders in their tracks. For example, authorities (service providers, employers, banks, parents, administrators, etc.) may be notified that there is a problem with one or more accounts and provided with vital information regarding the intruder(s), identifying information, where the attack originated from, and more. Such authorities may have in place methods e.g., for flagging or blocking access to user accounts.

In preferred embodiments, the user's account corresponds to a single sign-on (SSO) account. In this case, the user need only sign in once to a login server and employ a graphical user interface specifically designed to manage all of his other accounts.

According to another aspect, a second computer program product containing instructions residing in non-transient memory is disclosed, that when executed, causes a computer to perform the following steps: establish a secure communication session with a user device or user account; obtain an indication of a login attempt to the user device or user account; obtain peripheral information regarding the login attempt; determine whether the login attempt was made by an authorized user; and display the login attempt(s) to the authorized user along with the obtained peripheral information.

In embodiments, the computer program product may configure the computer to determine wither the login attempt was made by an authorized user based on receipt of valid login credentials and/or an appropriate user response to a displayed challenge. In embodiments, user credentials include inter alia, a fingerprint, a touch ID, password and/or passcode. In further embodiments, the obtained peripheral information includes images or video obtained from one or more cameras associated with the requesting device.

In some embodiments, the second computer program product may configure the computer to set alert levels regarding login attempts to the user's account, set types of peripheral data to collect if an alert is triggered; set types of information to display regarding login attempts; and/or set actions to take if an alert is triggered. For example, users may be provided with a graphical user interface, or "dashboard," for interfacing with peripheral data sensors. In this way, the authorized user can easily change various alert settings (e.g., using sliding bars, toggle switches, radio buttons, or the like).

The second computer program product may be configured to determine whether the user is authorized, for example, based on: valid credentials, number of failed login attempts, a response to a challenge or displayed optical code, a suspicious physical location and/or IP address.

According to yet another aspect, a graphical user interface for displaying account activity and threat reports is disclosed. The graphical user interface comprises: means for displaying information regarding the identity of requesting user(s); means for displaying location(s) of requesting user(s); and means for displaying additional peripheral information regarding login attempt(s).

In embodiments, the means for displaying the location includes displaying the physical location of the requesting user superimposed on a map. In other embodiments, the means for displaying the location includes displaying the network location of the device implemented by the requesting user to attempt to access the user's account. In still other embodiments, the means for displaying the location involves displaying images of the user's surroundings obtained by one or more cameras associated with the requesting device.

In further embodiments, the graphical user interface correlates login attempt information to create and display a threat report indicating recent login attempts to the user's account. In yet other embodiments, the graphical user interface is configured to automatically alert predetermined authorities on behalf of the authorized user regarding unauthorized login attempts.

It is appreciated that the above disclosed aspects, embodiments and examples are meant to be illustrative and are not meant to be limiting.

Advantageously, the present disclosure may be applied as part of an overall user account/password management suite.

BRIEF DESCRIPTION OF THE DRAWINGS

Non-limiting and non-exhaustive embodiments are described with reference to the following figures.

DETAILED DESCRIPTION OF THE INVENTION

Reference will now be made to various exemplary embodiments of the disclosure, examples of which are illustrated in the accompanying drawings. The following description describes certain embodiments, and should not be considered as limiting the invention to those embodiments. In addition, it is understood that "a" or "an" refer to one or more. In preferred embodiments, the user's account corresponds to a single sign-on (SSO) account where the user is able to manage multiple online user accounts.

Figure 1:
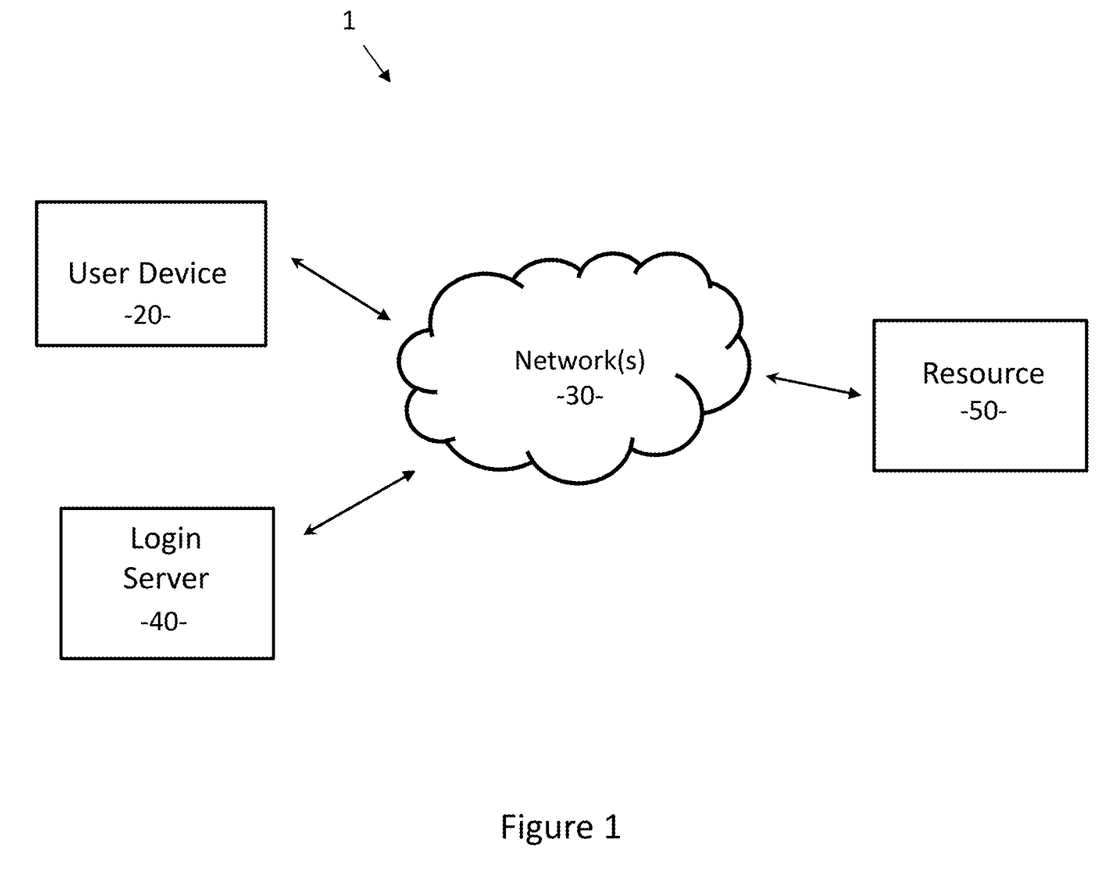
FIG. 1 illustrates an exemplary network environment in accordance with the present disclosure.

Turning now to the figures, which depict various exemplary embodiments of the invention, FIG. 1 shows a block diagram of an exemplary system 1 in which the present disclosure may be practiced. As illustrated, the system 1 includes one or more user device(s) 20, a login server 40, and one or more online resources 50 connected over one or more networks 30. It is understood that an authorized user has a login account with the login server 40 and is therefore termed "authorized user." It is also understood that the server 40 may include one or more associated servers/databases/datastores (not shown) necessary for maintaining secure user accounts, however for simplicity purposes, will be referred to here as "login server" 40.

It is appreciated that the user is able to log in to their account via any device 20 having a user interface and Internet connection capability. Thus, the user device 20 may encompass a PC, a laptop, desktop, smart phone, game system, wristwatch, secure entry door, ATM, vending machine, or any other similar device. See, e.g., FIG. 2a. For example, peripheral data such as photos and/or video may be obtained of a user requesting access to a locked door. To illustrate, peripheral information such as photos/video may be obtained of a user requesting access to a locked door with a key card. The login server 40 may additionally determine whether the user requesting access is the authorized user based on: photos, video, voice recognition, biometric information, etc.

Network 30 may comprise any combination of LANs, WANs, MANs, the Internet, Intranets, private networks, wired and/or wireless (e.g., IEEE 802.11 standard, satellite, cellular, GSM/GPRS, 3G, 4G, CDMA, TDMA) networks, mobile networks, public switched telephone networks (PSTN), SMS, SMSC, MMS, SMTP/MIME and/or IM distribution networks, or any other suitable network arrangements. Communication links (depicted by double arrows) may include transmission links such as wired, wireless, fiber-optic, mobile, and the like. It is further appreciated that Network 30 may also encompass one or more public or private cloud hosting platform or service for data processing and/or storage or other functions.

It is understood that login server 40 may comprise more than one physical or virtual servers in one or more locations.

According to certain aspects, a first computer program product is disclosed, that when executed, causes a user device 20 to establish a secure communication session with login server 40 over communication network 30 and obtain peripheral data regarding an account access request. Examples of secure sessions include, but are not limited to SSL, VPNs, etc. The first computer program product may contain instructions to be executed on the user device 20 and/or on the login server 40. In some cases, the first computer program product may include an App, plug-in, add-on, or the like and may be downloaded to the user device 20 during an initial registration process. Alternatively, instructions may be pushed to the user device 20. In some embodiments, the user device 20 may be instructed to obtain an image or video of the user via one or more cameras 110 associated with the device. For example, with secure physical entry, one or more cameras may be associated with locked doors, etc. In another example, a stolen mobile device may take image(s) of the user with a front facing camera as well as images of their surroundings with a rear facing camera associated with the mobile device.

The first computer program product includes instructions that cause the user device 20 to obtain peripheral information regarding the access request. Such information may include, but is not limited to, images, video, audio, IP/network address, GPS coordinates, time/date stamps, video and/or audio recordings of the access attempt, surrounding temperature (to determine whether the user is inside or outside), etc. Subsequently, the user device 20 sends the peripheral information to the login server 40 to process and display the peripheral data to the authorized user such that the authorized user is able to identify who made the login attempt—as well as when and where the login attempt occurred.

A second computer program product includes instructions that cause the login server 40 to acquire and analyze peripheral information from various sources regarding the login attempt. The peripheral information may be acquired from the user device itself 20 as well as from other sources. In this sense, the second computer program product causes the login server 40 to act as a portal. For example, instructions may be provided for accessing external information databases (e.g., maps, address listings, phone listings, facial image recognition databases, fingerprint databases, voice recognition databases, etc.) to correlate and display/superimpose with the obtained peripheral information. Additional instructions may cause the login server 40 to determine whether the login attempt was made by an authorized user. Further instructions cause the login server 40 to process and display the peripheral data to the authorized user such that the authorized user is able to identify who made the login attempt—as well as when and where the login attempt occurred.

It is to be appreciated that the user device 20 may be operated by either an authorized, or unauthorized, user. Thus, a determination should be made as to whether the user is authorized, or unauthorized, to access the device and/or user account. Such a determination may be made inter alia based on: valid user credentials, a number of failed login attempts, a response to a challenge presented to the requesting user, comparing image/video/audio/biometrics of the requesting user with stored image/video/audio/biometrics of the authorized user, a suspicious physical location and/or strange IP address.

In some cases, the challenge may be presented to the requesting user in the form of an optical code. Thus, when the user attempts to log in, they are presented with a challenge or optical code containing information including, but not limited to, session data, information encrypted with a public key, or a request for information that only the authorized user would know or have. If the user is authorized and has authenticated himself to user device 20 (e.g., by entering a PIN or fingerprint), he may use the device 20 to sign the challenge or optical code with a private key (stored on the device during registration with the login server 40). A successfully signed challenge or optical code received by the login server 40 determines that the user is authorized. Such login implementations include QR-login and Photo-login as disclosed in U.S. patent application Ser. No. 15/099,490 filed Apr. 14, 2016, and incorporated by reference herein in entirety.

In some embodiments, photos or video of the user may be obtained via a front facing camera the requesting device. In further embodiments, photos or video of the user's surroundings may be obtained (simultaneously or independently) via a rear facing camera of the requesting device. By obtaining a video—image and voice recordings of the user may be captured. Video acquired by a rear facing camera can further help to determine images and sound of the user's surroundings. Additional peripheral data may include date/time stamps, audio recordings, GPS coordinates, IP addresses, temperature, etc.

In embodiments, the requesting user is presented with a security warning or disclaimer indicating that their photo or information will be obtained if they continue with the login process. In other embodiments, information about the user is obtained surreptitiously so as not to tip off the user. Additional instructions may even cause the user device 20 to create a diversion while the peripheral data is obtained.

As mentioned, the login server 40 may perform additional analysis of the peripheral information received from user device 20. In one example, image analysis or image recognition software may be used to help identify who the user in the photo/video is. Likewise, image recognition software may be used to identify landmarks in photos/video of the user's surroundings. If fingerprint, retinal scan, or other biometric data is obtained as part of the peripheral information, the login server 40 may perform image analysis of this as well. If GPS data is obtained, the login server 40 may consult information from external map, or address, databases to translate the GPS data into a physical address and/or superimpose the user's location on a map. In addition, the login server 40 can correlate information obtained from diverse sources to make further inferences as to the requesting users' identity and/or location.

Advantageously, user account activity is presented to the authorized user in an easy to understand format on a graphical user interface or "dashboard." This dashboard, or monitoring graphical user interface, helps the user to quickly find out "who" is attempting to log in to their account, as well as "where" and "how" the attempt occurred. For example, the monitoring graphical user interface may display: a photo of the user (and any other identifying information), a date/time stamp of the login attempt, a physical address where the attempt occurred superimposed on a map, the IP address associated with the attempt, and the type of device used to try and gain access (e.g., iPhone).

Figure 2A:
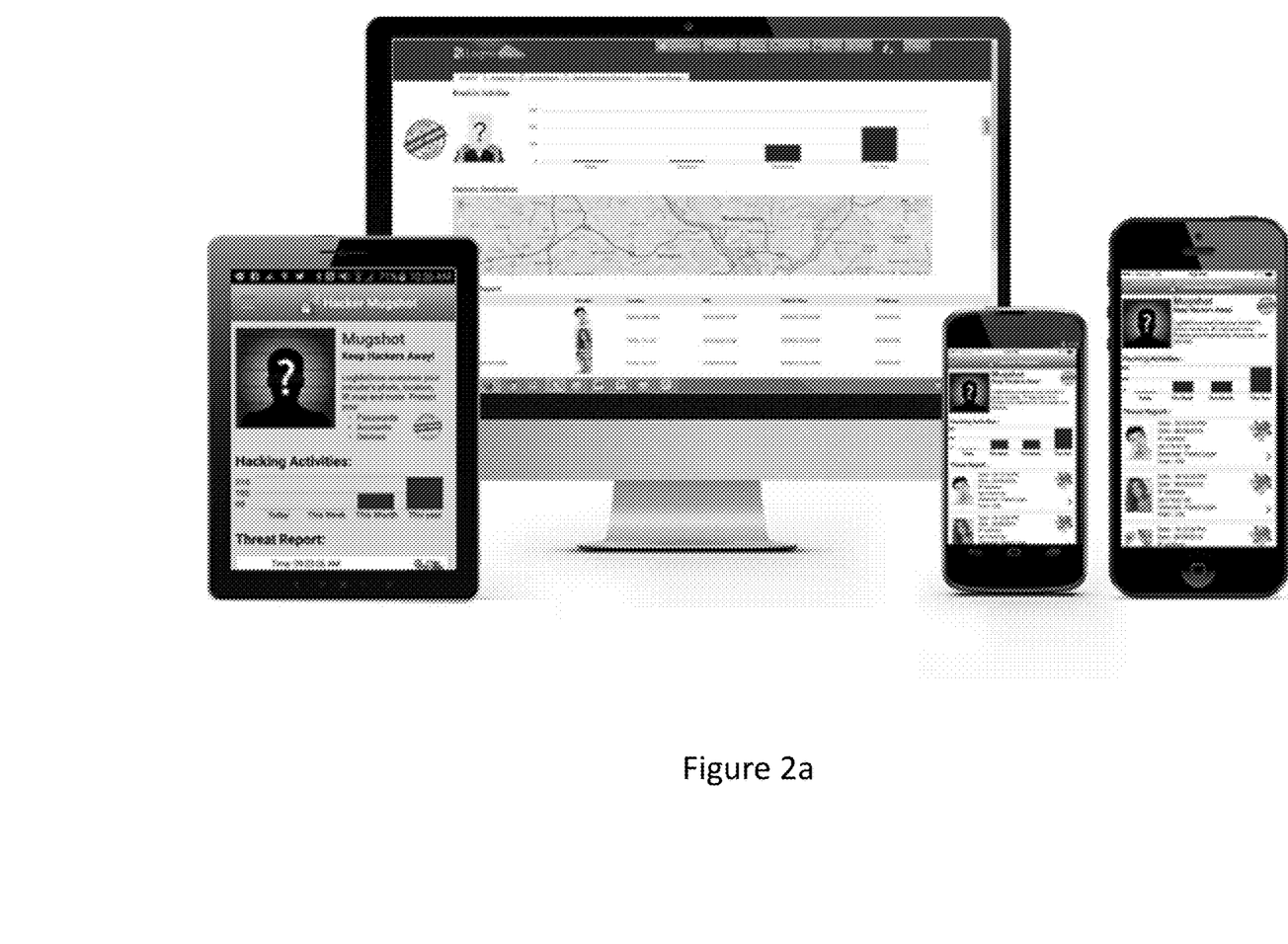
FIG. 2a illustrates exemplary user device(s) that may be used in accordance with principles of the present disclosure.

FIG. 2a shows other exemplary user device(s) 20 that may be used in accordance with the present disclosure. As mentioned, such devices include any device having a graphical user interface display and internet connection capability. For example, a PC, laptop, smart phone, iPad, game station, wristwatch, secure entry door, and/or other similar "smart" device. In addition, the instructions may be used on various platforms including iPhone and Android based devices.

Figure 2B:
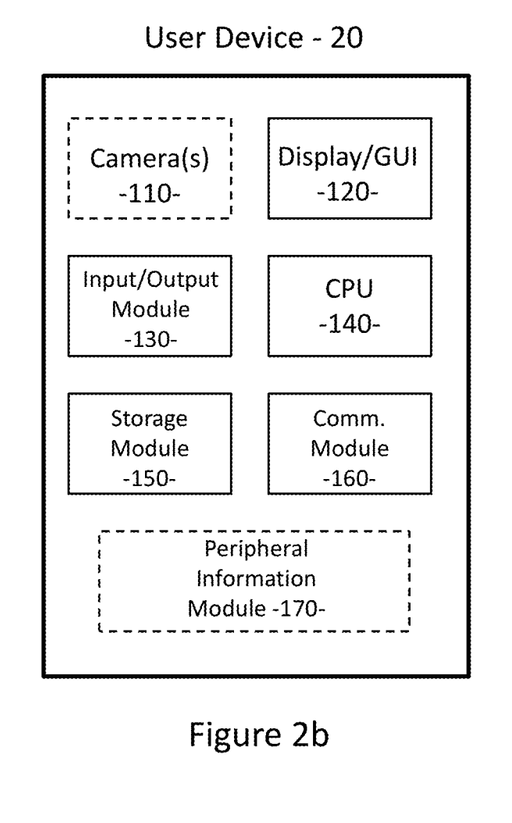
FIG. 2b shows an exemplary block diagram of a user device in accordance with principles of the present disclosure and FIG. 2c shows an exemplary block diagram of a login server in accordance with principles of the present disclosure.

FIG. 2b is a block diagram depicting exemplary user device 20 components. As shown in FIG. 2b, the user device 20 may include: a display/GUI module 120, an input/output module 130, a CPU 140 having browser software, a storage module 150 having non-volatile memory for storing computer instructions, communication module 160, and peripheral information module 170. In addition, user device 20 may also include one or more associated camera(s) 110. It is understood that the disclosed computer instructions may utilize some, or all, of these modules. It is also appreciated that the modules are in communication with one another using any combination of hardware and software. It is further appreciated that there may be overlapping of functions between the different modules and that some of the disclosed functions may be performed by a combination of modules.

In embodiments, a front facing camera 110 can be instructed to obtain an image of the user. In other embodiments, a rear facing camera 110 can be instructed to obtain an image of the user's surroundings. The display/GUI module 120 may display information to the user as well as provide for interaction with the user. The input/output module 130 may obtain settings from the user, as well as work with peripheral information module 170 to obtain login information. Additionally, the input/output module 130 may work with display/GUI module 120 to display information to the user. In addition to camera(s) 110, input/output device(s) associated with module 130 include inter alia, microphones, touch screens, keypads, thermocouples, biometric readers, etc. Communication module 160 allows the user device 20 to communicate with network(s) 30 (e.g., the Internet, cell network(s), etc.) as well as obtain GPS information from satellites. Peripheral information module 170 may obtain: timestamps, GPS data, device information (IP address, MAC address, device manufacturer information), images, video, audio, temperature, etc. It is appreciated that data may be collected for valid, as well as invalid, login attempts (e.g., if the authorized user mistypes their password, enters an incorrect security question, enters invalid data, or the like).

Figure 2C:
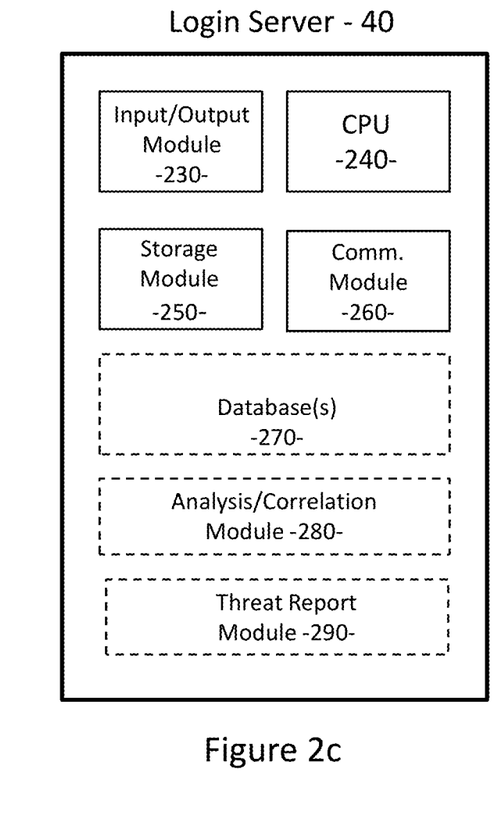

As shown in FIG. 2c, the login server 40 of the present disclosure may comprise inter alia: input/output module 230, a CPU 240, storage module(s) 250, communication module 260, one or more collocated (or remote) databases 270, Analysis/correlation module 280, and Threat report module 290.

It is appreciated that communication module 260 performs communication with the user device(s) 20 over one or more networks 30, such as the Internet, Intranets, Private networks, etc. Communication module 260 may also communicate with one or more external databases (not shown) over network(s) 30. Communication module 260 encompasses inter alia communication ports, network interface cards, transmitter(s), receiver(s), GPS antenna, etc.

Storage module 250 comprises internal and/or external storage and may include access to one or more local or distributed servers and/or databases/datastores 270. Analysis and correlation module 280 may use additional software instructions, e.g., for image analysis, facial recognition, voice recognition, fingerprint analysis, retinal scan analysis, GPS coordinate/physical address mapping, etc. For example, the analysis and correlation module 280 may translate GPS coordinates and superimpose the address where the login attempt on a map for user convenience. Threat report module 290 compiles login attempts over a determined time period to convey number and/or frequency of login attempts to a user's account. For example, the amount of login attempts may be graphed per month to show how recent activity compares to previous months, etc.

Figure 2D:
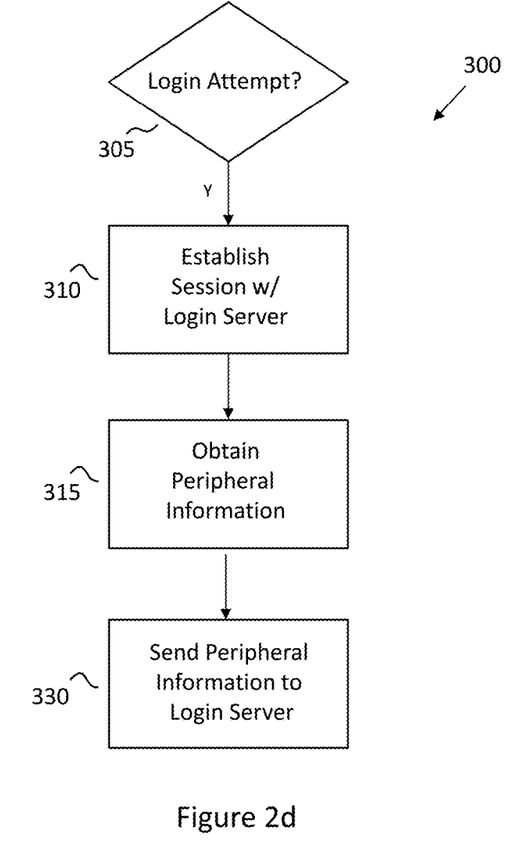
FIG. 2d and FIG. 2e show exemplary flowcharts of computer implemented steps in accordance with principles of the present disclosure.

FIG. 2d shows instructions 300 executed on a user device 10 with a first computer program product. A login attempt to a user device 10 and/or user account is detected at step 305. If not already established, a session is established between the requesting user device 10 and the login server 20 (step 310). The requesting device 10 obtains peripheral information regarding the login attempt from one or more diverse sources (step 315). Peripheral data may include, but is not limited to, images, video, audio, GPS location, IP address, time/date, etc. In step 330, the obtained peripheral information is sent to the login server 20 for analysis.

Figure 2E:
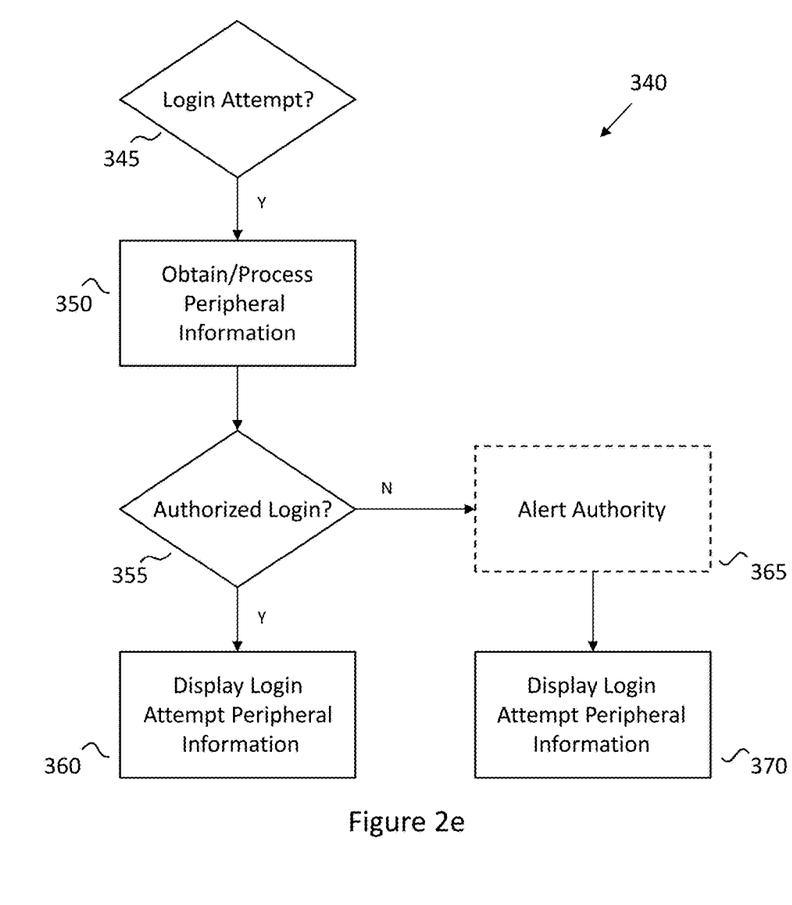

FIG. 2e shows instructions executed on login server 20 with second computer program product 340. The login server 20 detects a login attempt to user device 10 and/or a user account (step 345). This step may, or may not, coincide with step 305. In step 350, peripheral data regarding the login attempt is obtained and processed by the login server 20. Here, the peripheral data may be obtained from the user device itself 10 and/or from other network sources. In addition, the peripheral data may be combined, processed and/or correlated with data from other databases in order to make further inferences about the requesting users' identity or location.

In step 355, a determination is made as to whether the login attempt is authorized. Such a determination may be made based on entered user credentials, an appropriate response to a challenge, and/or comparison to previously stored peripheral information. If the login attempt is unauthorized, the login server 20 may further be configured to alert one or more authoritie(s). (Step 365).

Steps 360 and 370 both instruct the login server 20 to display the login attempt peripheral information. The login attempt information and peripheral information is displayed on a graphical user interface as described below.

As mentioned, the login server 40 may perform additional analysis of the peripheral information received from user device 20. In one example, image analysis or image recognition software may be used to help identify who the user in the photo/video is. Likewise, image recognition software may be used to identify landmarks in photos/video of the user's surroundings. If fingerprint, retinal scan, or other biometric data is obtained as part of the peripheral information, the login server 40 may perform image analysis of this as well. If GPS data is obtained, the login server 40 may consult information from external map, or address, databases to translate the GPS data into a physical address and/or superimpose the user's location on a map. In addition, the login server 40 can correlate information obtained from diverse sources to make further inferences as to the requesting users' identity and/or location.

According to a further aspect of the disclosure, a graphical user interface (400-800) is disclosed for displaying information regarding login attempts to the authorized user. The graphical user interface (400-800) comprises: optional means for displaying a photo or video of a user attempting to login to the user's account; means for displaying the location of the user when the login attempt was made; means for displaying other peripheral information regarding the login attempt; and means for performing correlation/analysis of the login information and means for generating a threat report.

It is appreciated that user device(s) 20 and the login server 40 include a variety of hardware and software. Preferably, the user devices 20 comprise: one or more processors, one or more transmitters and receivers, a power supply, storage media, memory/RAM, and input/output device(s). Input/output devices may include a: keyboard, microphone, speaker, touch screen, stylus, mouse, display, front facing camera, rear facing camera, scanner, etc. User devices may also include data interface(s), such as IR, USB, firewire, Bluetooth, etc. Preferably, the user devices include a graphical user interface and web browsing capabilities such as provided by Internet Explorer, Firefox, Chrome, Safari, or the like.

Figure 3:
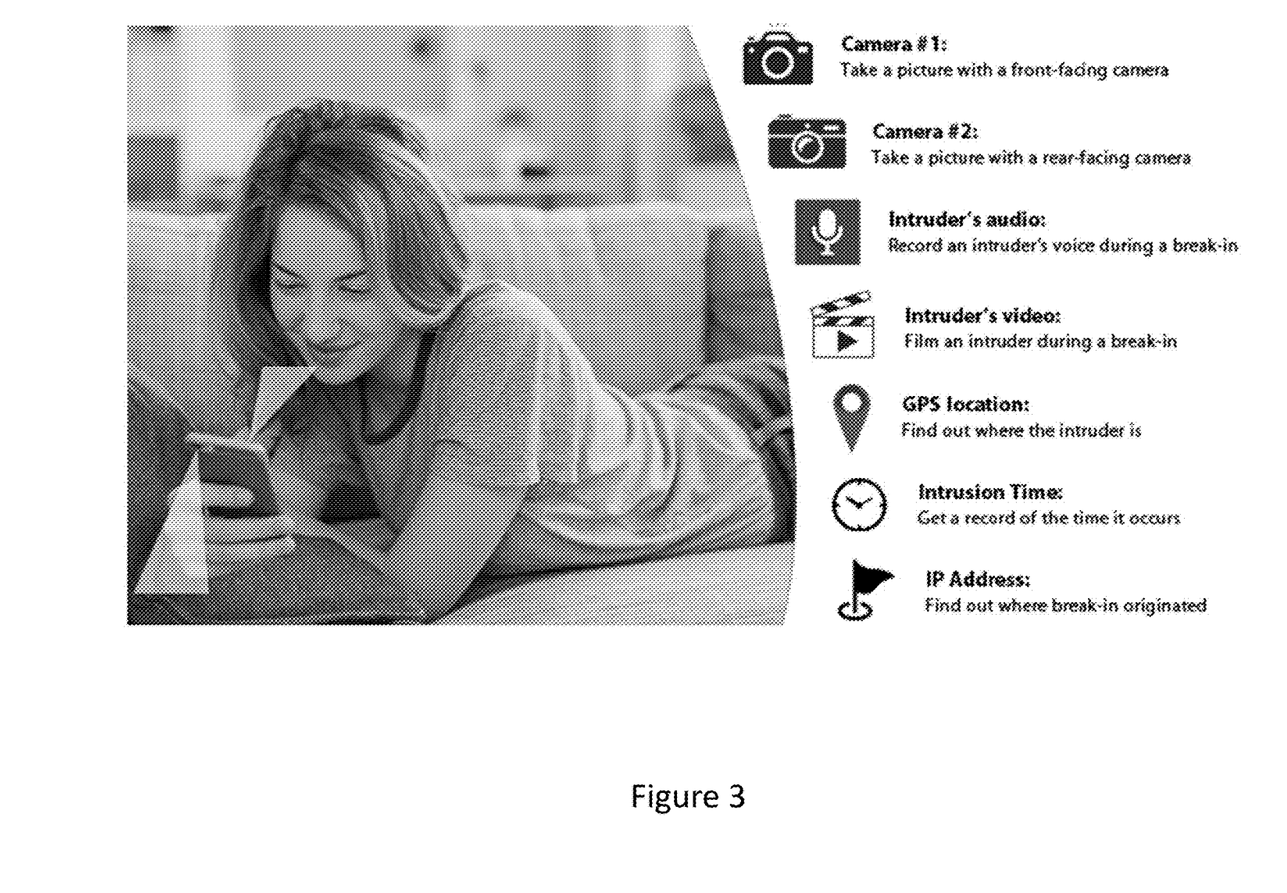
FIG. 3 illustrates exemplary peripheral data obtained with a login attempt in accordance with the principles of the present disclosure.
Figure 4:
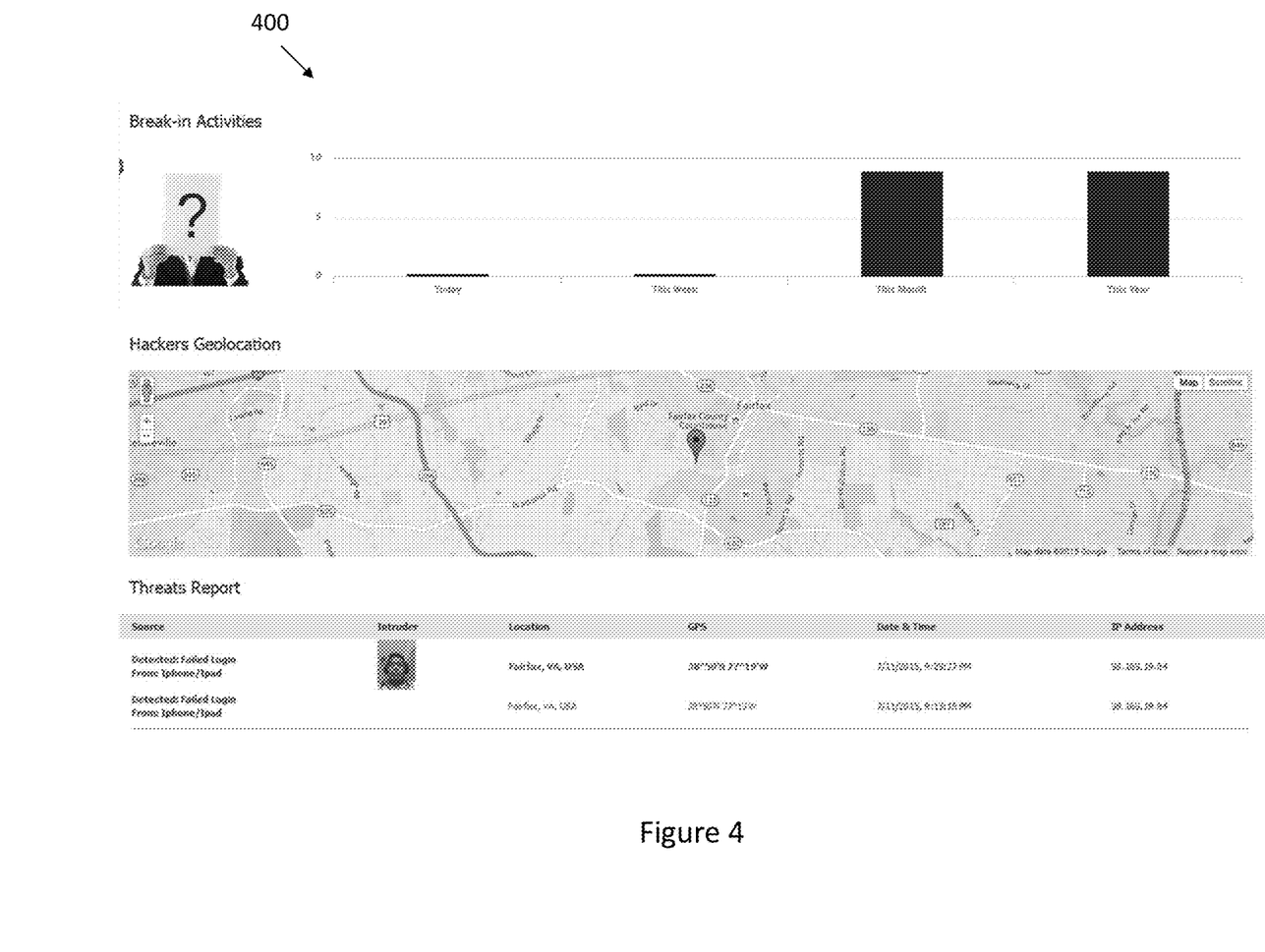
FIG. 4-8 illustrate graphical user interface displays according to various embodiments of the disclosure.
Figure 5:
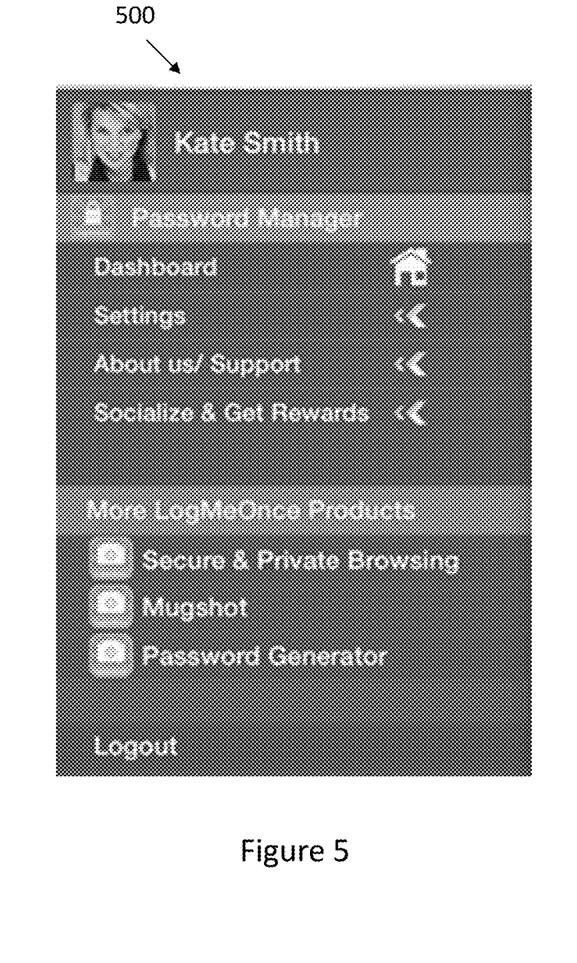
Figure 6:
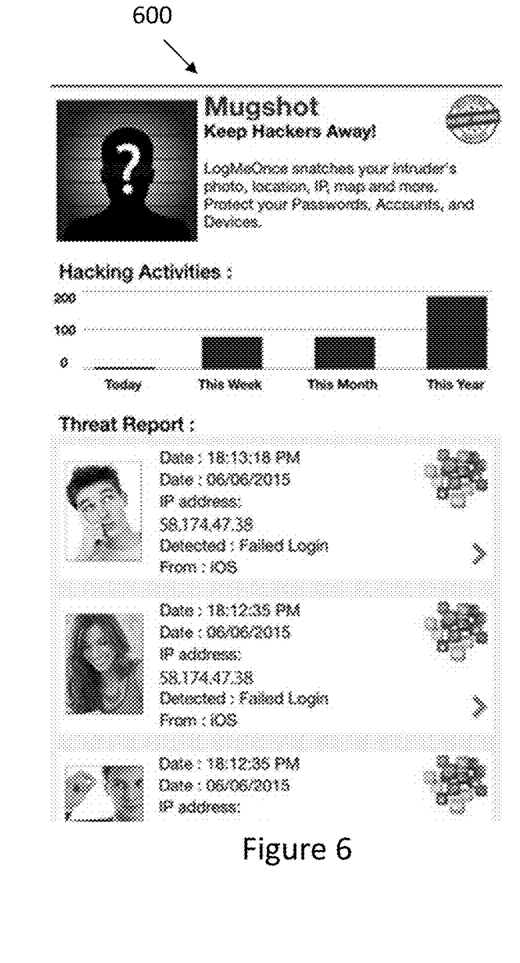

FIG. 3 illustrates examples of peripheral data obtained during an account access attempt. Here, the user may be either an authorized user or an unauthorized user. According to embodiments of the disclosure, user device 20 may be activated to obtain peripheral data regarding the login attempt. As depicted in FIG. 3, peripheral data may involve: obtaining picture(s) of the user with a front facing camera of the device; obtaining picture(s) of the surroundings/environment with a rear facing camera; recording audio of the user and/or background noise; obtaining GPS data regarding the user's location; and recording the time/date of login as well as IP address and type of user device. It is appreciated that data may be collected for both valid, and invalid, logins by the user.

In embodiments, the authorized user may log in to their account on the login server 20 using a variety of login methods. Such login methods may involve passwords, passcodes, passphrases, pin numbers, optical codes, digital certificates, tokens, fingerprints, touch ID, or the like. In certain embodiments, passwords may include optical codes to log in a user as described in U.S. application Ser. No. 14/304,076 incorporated herein by reference in entirety. Examples of optical codes include, but are not limited to: bar codes, quick response (QR) codes, pictures, images, and videos. Here, it is appreciated that authentication and/or authorization of the user may happen behind the scenes using any standard or non-standard authentication protocols.

In embodiments, the login server 40 is able to send commands to a registered user device 20 to obtain data via an on-board camera, microphone, GPS system, etc. Input/Output module 230/Communication module 260 are able to obtain data input from the user as well as user device 20 data (e.g., make, model, etc.). Communication module 260 performs communication with other computer devices over one or more networks, such as the Internet, Intranets, private networks, etc. Storage module 250 comprises internal and/or external storage and may also include access to one or more distributed servers and/or databases/datastores.

Figure 7:
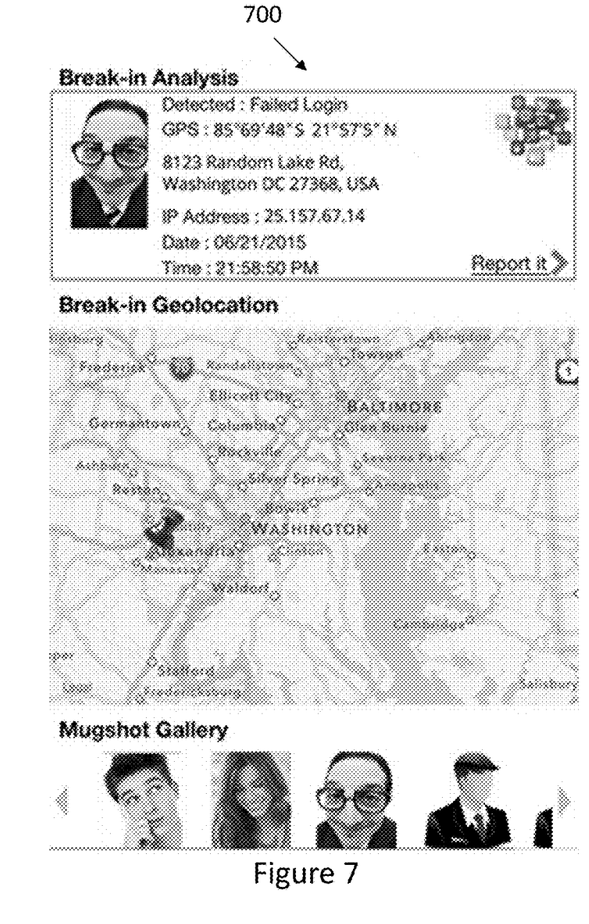
Figure 8:
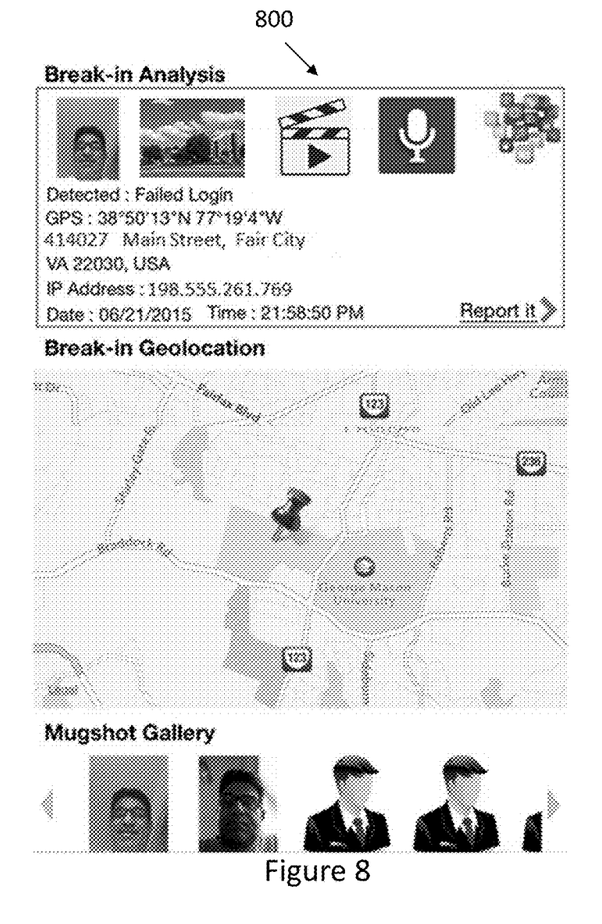

FIGS. 4-8 depict exemplary graphical user interfaces where peripheral login data is correlated, compiled and provided to the authorized user. Obtained pictures, IP addresses, maps, locations, etc. are assembled on the monitoring graphical user interface for easy reference. For example, pictures of authorized and unauthorized users may be displayed as well as when and where they tried to log in. FIGS. 7 and 8 depict a mugshot "gallery" showing photos of all users who have attempted to login/gain access to a user account. Maps, statistical data, and threat reports may be compiled and presented to the user in a convenient manner. In addition, links may be provided to quickly and easily report unauthorized use.

Additional dashboard options may further expand account protection e.g., by taking more extensive pictures of an intruders' surroundings and recording audio and video of the intruder when they attempt to break into an account. For example, the authorized user may be able to listen to the intruder fumble and get frustrated as they type in the wrong passwords and get denied. As a result, the authorized user can gain satisfaction knowing that they have caught intruders in the act—and stopped the intruders from taking their personal data and identity.

In certain aspects, the graphical user interface provides account management capabilities for the authorized user. In embodiments, the authorized user may be able to set different trigger levels and/or conditions for acquiring peripheral login data. For example, an authorized user may indicate via the managing graphical user interface to obtain peripheral login data when login attempts arise from certain IP addresses, countries, etc. In further embodiments, peripheral data can be correlated or statistically mapped to identify anomalies and/or generate threat reports. For example, if two log-ins occurred around the same time—but two geographically distant locations.

Preferably, the authorized user's account is fitted (or retro-fitted) with multiple sensors and/or probes on multiple layers that may be set via the managing graphical user interface for detecting unauthorized log-in attempts. The sensors and/or probes help to establish a comprehensive defense layer with various methods of detection and protection. Cross-referencing of data may further be performed to validate the user as the authorized user.

Some aspects of the present disclosure are similar to a "burglar alarm" for user accounts and/or passwords. Thus, when intruders attempt to break in to a user's account, they are figuratively caught red-handed.

In preferred embodiments, the authorized user's account corresponds to a single sign-on (SSO) account where the user is able to sign-in to/manage multiple user accounts using a single password or credential.

It is appreciated that disclosed modules may take the form of computer executable instructions, such as program modules, executed by one or more computer or other devices. Program modules may include programs, routines, objects, data structures, etc. for performing particular tasks. Functionality of the modules may be combined or distributed as desired in various embodiments.

It is appreciated that user device(s) 20 include a variety of hardware and software. Preferably, the user devices 20 comprise: one or more processors, one or more transmitters and receivers, a power supply, storage media, memory/RAM, and input/output device(s). Input/output devices may include a: keyboard, microphone, speaker, touch screen, stylus, mouse, display, front facing camera, rear facing camera, scanner, etc. User devices 20 may also include data interface(s), such as IR, USB, firewire, Bluetooth, etc. Preferably, the user devices 20 include iPhone and Android based devices, and further include web browsing capabilities such as provided by Internet Explorer, Firefox, Chrome, Safari, or the like.

It is understood that the method steps and modules of the present disclosure may be performed using any combination of hardware and/or software as will be appreciated by those skilled in the art. Preferably, instructions residing on computer readable media configure the user device and/or login server to execute the method steps. Such instructions may be in the form of an API, plug-in, add-on, download, or the like and may also contain additional hardware and/or software instructions for performing the disclosed method steps.

The disclosed modules may take the form of computer executable instructions executed by one or more computer or other devices. Program modules may include programs, routines, objects, data structures, etc. for performing particular tasks. Functionality of the modules may be combined or distributed as desired in various embodiments. Such instructions may be in the form of an API, plug-in, add-on, download, or the like. Software instructions may further include custom macros, sub-routines, logic, or the like implemented using commercially available software such as MS SQL Server™, Visual Basic, C, C++, SMIL, XML, HTML, XHTML, Java, JavaScript, C#, APIs, etc.

As set forth above, the present disclosure provides an extra security layer as part of an overall credential management suite.

The foregoing discussion of the preferred embodiments has been presented for purposes of illustration and description. It is not intended to be exhaustive or to limit the disclosure to the above examples. Many variations and modifications of the embodiments described herein will be apparent to one of ordinary skill in the art in light of the present disclosure. For example, other security layers may be added to the device 20. In certain embodiments, the user may be requested to enter a PIN or password into the device 20 and/or to provide biometric information (fingerprint, retinal image) before gaining access to an account, etc.

The invention claimed is:

1. A computer program product which embodies a non-transitory memory containing instructions, wherein the instructions when executed by a processor, cause a computer to perform the following steps:

establish a secure communication session with a login server over a communication network;

obtain peripheral information regarding a login attempt by an unauthorized user to an authorized user account of an authorized user, wherein the authorized user account has an authorized user and is managed by the login server; and send the obtained peripheral information to the login server and at least in response to an invalid login attempt, display at least a network location of the computer device juxtaposed with at least one image of the unauthorized user and their physical surroundings at the time the login attempt occurred and enable the authorized user to identify the identity of the unauthorized user making the login attempt, the unauthorized user's location and the time of the login attempt.

2. The computer program product of claim 1, further comprising instructions that cause the computer to obtain images or video of the user requesting access from a camera associated with the computer and to send the images or video from the camera to the login server to be displayed juxtaposed with the network location.

3. The computer program product of claim 1, further comprising instructions that cause the computer to obtain images or video of the user requesting access from a front facing camera associated with the computer, and images or video of the requesting user's surroundings from a rear facing camera associated with the computer and to send the images or video from the front and rear facing cameras to the login server to be displayed juxtaposed with the network location.

4. The computer program product of claim 1, wherein the instructions configure the computer to first determine whether the login attempt was made by an authorized user, and if the login attempt was not made by an authorized user, instruct the computer to obtain peripheral information regarding the login attempt.

5. A computer program product which embodies a non-transitory memory containing instructions, wherein the instructions when executed by a processor, cause a login server computer to perform the following steps:

establish a secure communication session with a user device or user account;

obtain an indication of a login attempt to an authorized user account;

obtain peripheral information regarding the login attempt; and at least in response to an invalid login attempt, display at least a network location of the user device juxtaposed with at least one image of the unauthorized user and their physical surroundings at the time the login attempt occurred to an authorized user via a graphical user interface and thereby enable the authorized user to identify the identity of the unauthorized user making the login attempt, the unauthorized user's location and the time of the login attempt.

6. The computer program product of claim 5, further causing the login server computer to first determine whether the login attempt was made by an authorized user, and if the login attempt was not made by an authorized user, to obtain peripheral information regarding the login attempt.

7. The computer program product of claim 5, further configured to determine whether the login attempt was made by an authorized user based on an appropriate user response to a displayed challenge or biometric information obtained from the requesting user.

8. The computer program product of claim 5, further comprising instructions that cause the computer to obtain images or video of the user requesting access from a camera associated with the user device and to display the images or video juxtaposed with the network location via the graphical user interface.

9. The computer program product of claim 5, further comprising instructions that cause the computer to obtain images or video of the user requesting access from a front facing camera associated with the requesting device, and images or video of the requesting user's surroundings from a rear facing camera associated with the requesting device and to display the images juxtaposed with the network location via a graphical user interface.

10. The computer program product of claim 5, further including instructions that cause the computer to receive customized account settings from an authorized user regarding types of peripheral data to obtain surrounding a login attempt.

11. The computer program product of claim 5, further including instructions that cause the computer to receive customized account settings from an authorized user regarding alert options that enable the authorized user to immediately alert authorities upon an invalid login attempt.

12. A computing device comprising a graphical user interface display screen:

the computing device being configured to display on the screen peripheral information regarding a user at least in response to an invalid login attempt to an authorized user's account;

the computing device further configured to display on the screen at least a network location where the login attempt was made juxtaposed with an image of an unauthorized user and their physical surroundings at the time the login attempt was made and thereby enable an authorized user to identify the identity of the unauthorized user making the login attempt, the unauthorized user's location and the time of the login attempt;

the computing device further including instructions to receive customized account settings from an authorized user regarding additional types of peripheral data to obtain surrounding a login attempt; and the computing device further including instructions to receive customized account settings from an authorized user regarding alert options that enable the authorized user to immediately alert authorities upon an invalid login attempt.

13. The computing device of claim 12, further configured to display the physical location of the requesting user device superimposed on a map juxtaposed to the image of the user or user's surroundings.

14. The computing device of claim 12, further configured to display one or more photos or videos of a user who has attempted to login to the authorized user's account at the time of the login attempt.

15. The computing device of claim 12, further configured to display recent correlated login activity and create a threat report regarding an authorized user's account.

16. The computing device of claim 12, further configured to first determine whether the user is an authorized user, and if the login attempt was not made by an authorized user, to display peripheral information regarding the login attempt.

17. The computing device of claim 16, wherein the means for determining if a requesting user is an authorized user is based on receiving an appropriate response to a challenge displayed on the requesting device or obtained biometric information of the requesting user.

\* \* \* \* \*